W. L. GEBBY.
Seed-Planter.
No. 64,519.
Patented May 7, 1867
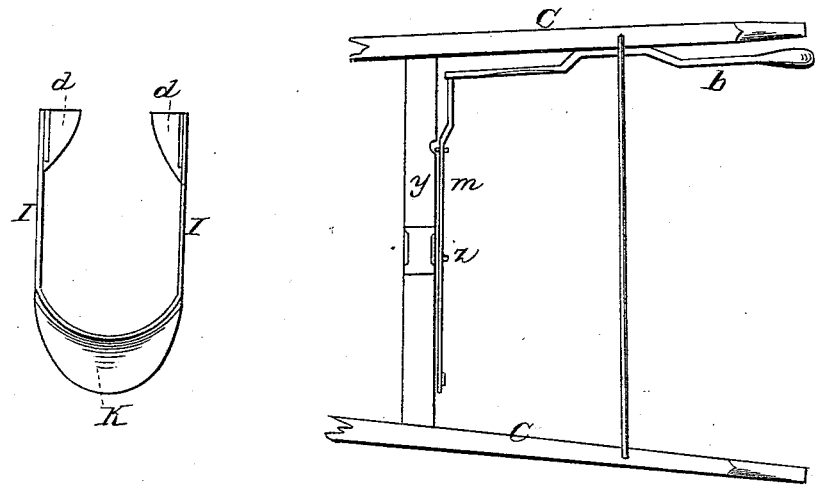
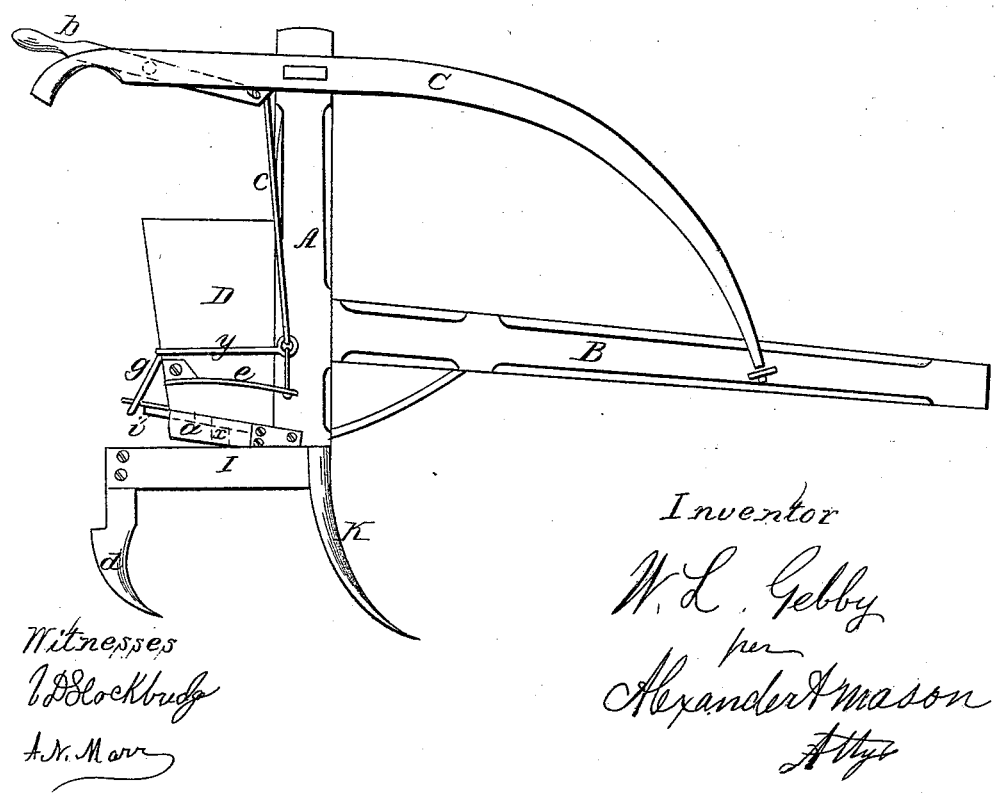
Witnesses
T. D. Stockbridge
A. N. Marr
Inventor
W. L. Gebby
per
Alexander H. Mason
Atty.

United States Patent Office.

WILLIAM L. GEBBY, OF NEW RICHLAND, OHIO.

Letters Patent No. 64,519, dated May 7, 1867.

---

PLANTER AND CULTIVATOR COMBINED.

---

The Schedule referred to in these Letters Patent and making part of the same.

---

TO ALL WHOM IT MAY CONCERN:

Be it known that I, WILLIAM L. GEBBY, of New Richland, in the county of Logan, and in the State of Ohio, have invented certain new and useful improvements in "Combined Cultivator and Seed-Planter;" and do hereby declare that the following is a full, clear, and exact description thereof, reference being had to the accompanying drawings and to the letters of reference marked thereon, making a part of this specification.

In the annexed drawings, B represents the ordinary plough-beam, to which there is connected at the rear end the vertical shaft A. Extending from the forward of the beam over the rear of the upright are suitable handles C, connected by the brace y. K represents the large shovel, which is secured at the lower end of the shaft, and from which are extended the metallic arms I I, having the small teeth d d at their ends. These teeth and shovel, being connected by their arms, form, as it were, one piece, which effectively plough the earth and cover the seed, as will be more fully set forth. Upon the back of the shaft A is placed the hopper-box D, which is bottomless, and resting upon the small block a, with one or more perforations x in its bottom. Placed in a small groove in this block is the seed-slide i, which allows the seed to be dropped through the opening in the block a.

It will be observed that the seed-slide projects in the rear of its groove, and is there attached to a bent rod, g, which is passed around to the side of the hopper-box, and there connected to a small vertical rod, c, which extends to the plough-handle. m is a horizontal bar, pivoted at its end to the brace y, and connects the rod c, as well as the lever b, which lies parallel, to the right handle of the plough. This lever being pivoted at its centre, will readily operate the rods and open the seed-slide. At the side of the hopper-box is a small steel spring, which is connected by a small rod to the vertical rod c, and whenever the slide is opened by the lever this spring carries it back to its normal condition.

This cultivator and seed-sower may be used in planting and cultivating corn or other grain. The large shovel will open the furrow, and the seed may be dropped immediately therein by the ploughman, with the lever b, and then closed by the small shovels d, which throw the earth upon the grain after being dropped. The large clods of dirt or other obstacles are prevented from dropping into the furrow by the arms I.

Having thus fully described my invention, what I claim as new, and desire to secure by Letters Patent, is—

1. The arrangement of the arms I I, with the shovel K and teeth d d, in combination with the shaft A, and beam B, in the manner and for the purposes specified.

2. The hopper-box D, with seed-slide i, when operated by means of the lever b, rods c and g, and spring e, when constructed and used in the manner herein set forth.

In testimony that I claim the foregoing I have hereunto set my hand and seal this 23d day of March, 1867.

WM. L. GEBBY.

Witnesses:
PHILLIPP YOUNG,
JOHN C. LINTON.